United States Patent Office 3,635,862
Patented Jan. 18, 1972

3,635,862
STABILIZED POLYMER COMPOSITIONS
John Robert Dunn, Sarnia, Ontario, Canada, assignor to Polymer Corporation, Sarnia, Ontario, Canada
No Drawing. Filed Dec. 3, 1969, Ser. No. 881,856
Claims priority, application Canada, Jan. 16, 1969, 40,289
Int. Cl. C08c 11/60; C08d 9/00
U.S. Cl. 260—27 BB
7 Claims

ABSTRACT OF THE DISCLOSURE

Resistance to aging of a polymer of conjugated diolefin such as a high cis-1,4 polybutadiene or a block copolymer of butadiene and styrene or alpha methyl styrene is improved by the addition of 0.1–5 parts of a compound such as 2-mercaptobenzimidazole, 2-mercaptobenzoxazole or a hydrocarbyl substituted dithiohydantoin.

---

This invention relates to stabilized compositions of polymers of conjugated diolefins. In particular, it relates to a process of improving ageing resistance of a polymer of butadiene-1,3.

To be useful as raw materials for the production of rubber goods, polymers of conjugated diolefins must be protected against oxidation. For that purpose, various antioxidants are admixed. Typical antioxidants include alkylated phenols, hydroquinones, aromatic amines, etc. Nevertheless, the stability of polymers containing such antioxidants is not satisfactory: when exposed to high temperatures for prolonged periods of time, they degrade and lose rubber elastic properties.

It is an object of this invention to provide a stabilized composition of a polymer of a conjugated diolefin. Another object is to provide a process for producing a vulcanizate of a polymer of butadiene-1,3 having improved resistance to ageing.

The present invention provides a stabilized polymer composition comprising a mixture of a polymer of a conjugated diolefin and 0.1–5 parts by weight per 100 parts by weight of polymer of a compound having the general structure:

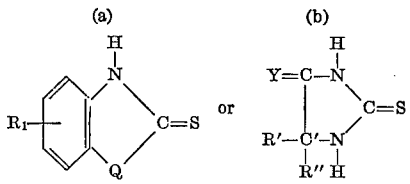

or metallic salts derived therefrom where Q is oxygen or imine group, Y is oxygen or sulfur, R is a hydrocarbyl radical, $n$ is a number from 0 to 3, R′ and R″ each is hydrogen or a $C_1$–$C_6$ hydrocarbyl radical or both are a divalent polymethylene radical forming an alicyclic ring with C′.

This invention also provides a process of producing a vulcanizate having an improved resistance to ageing which comprises compounding and vulcanizing with sulfur and a vulcanization accelerator the polymer composition as described above.

The polymer which can be used in this invention is a polymer of a conjugated diolefin containing 4–5 carbon atoms. Preferably it is a polymer of butadiene-1,3 produced in the presence of an organometallic catalyst. It may be a homopolymer or a copolymer of a conjugated diolefin with polymerizable vinylidene compounds such as styrene, alpha methyl styrene, acrylonitrile or methyl methacrylate. The preferable homopolymer is a polybutadiene containing at least about 75% and preferably more than 90% of the butadiene units in the cis 1,4 configuration. The polybutadiene of this type is known; it can be produced in a solution polymerization system using an organometallic catalyst comprising an organometallic compound of a Group III–A metal, for example, an alkyl aluminum halide, and a compound of a transition metal, preferably a metal of Group VIII of the Periodic Table. Representative examples of a Group VIII metal compound are cobalt or nickel salts, e.g. cobaltous naphthenate or octanoate. The copolymer is preferably a block copolymer containing a block of polymerized butadiene-1,3 attached to one or more blocks of polymerized vinylidene compounds. The block copolymer of the above type is known; it can be made by the polymerization of one monomer in the presence of a lithium-based catalyst such as a lithium alkyl or a lithium alkyl modified with an ether to form an active polymer and then consecutively polymerizing one or more monomers preferably different from the first monomer in the presence of said active polymer. The block copolymer of the ABA type in which A stands for a block of polymerized vinylidene aromatic hydrocarbon and B for a polybutadiene block is valued for its rubber-like properties in the unvulcanized state. The molecular weight of the butadiene polymer used in this invention is not critical. It may vary within wide limits, from about 25,000 to above 1,000,000. If desired, the polymer of butadiene-1,3 may be blended with natural rubber or synthetic rubbers in amounts of up to 1:4 in parts by weight.

The compound which is mixed with the polymer of conjugated diolefin in accordance with this invention is a heterocyclic compound having the general formula:

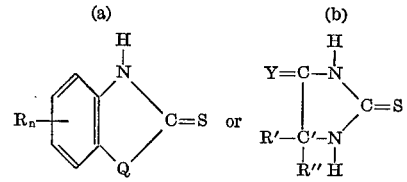

where Q is oxygen or imine group, Y is oxygen or sulfur, R is a hydrocarbyl radical, $n$ is a number from 0 to 3, R′ and R″ each is hydrogen or a $C_1$–$C_6$ hydrocarbyl radical or both are a divalent polymethylene radical forming an alicyclic ring with C′.

It will be recognized that in the above formula, resonance equilibrium conditions exist and that thiosulfur may also be shown as a mercaptosulfur, e.g.

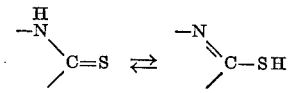

Compounds of the above type are capable of forming salts with metals. These metal salts, e.g. zinc salts, can be used with success in accordance with this invention.

Suitable compounds include 2-mercaptobenzimidazole and 2-mercaptobenzoxazole and thiohydantoin compounds such as 5,5-dialkyl-2,4-dithiohydantoin, 5,5-dialkyl-2-thiohydantoin, 5 - alkyl-5-phenyl-2,4-dithiohydantoin where the alkyl substituent may be a $C_1$–$C_6$ hydrocarbon radical, and 5,5′-pentamethylene-2,4-dithiohydantoin. The dithiohydantoin compounds are the preferred additives and best results are obtained with dialkyl-substituted dithiohydantoins such as 5,5′-dimethyl-2,4-dithiohydantoin.

The compounds used in this invention for stabilization of conjugated diolefin polymers have a chemical structure which is similar to that of a great many conventional accelerators of the sulfur vulcanization such as 2-mercaptoimidazoline, thiazoline, imidazolines, 2-mercaptobenzothiazole, N-tertiary butyl 2-benzothiazole sulfenamide. In contrast to these accelerators, the compounds of this invention do not accelerate vulcanization; they act primarily as antioxidants that are effective in depressing or eliminating degradation effects in polymer compositions during their processing, storing and use.

The heterocyclic compound of this invention may be dispersed within the butadiene polymer during the recovery of raw rubber which is the preferable method, or during one of the milling steps. The amounts to be employed are not critical and may vary according to service conditions of the polymer composition. In general, it is satisfactory to employ between 0.1 and 5 parts by weight per 100 parts by weight of polymer, and a particularly useful amount has been found to be between about 0.2 and 2 parts.

The compound of this invention is especially effective when added to the polymer of butadiene-1,3 containing about 0.2 to 2.0 parts of an antioxidant selected from the group of hydrocarbyl substituted phenols, hydrocarbyl substituted phosphites or their mixtures. Representative examples of such antioxidants are 2,6-ditertiary butyl-4-methyl phenol, 2,2'-methylene bis (4-methyl-6-tertiary butyl phenol), alkylated phenyl phosphites such as tri(nonyl phenyl) phosphite.

If the polymeric composition of this invention is to be vulcanized, it is desirable to admix also about 0.1 to 5 parts by weight, preferably less than 1 part, per 100 parts of polymer of a rosin acid. The rosin acid, which may be either a natural wood rosin, a disproportionated rosin or a mixture of rosin acid and a fatty acid, improves the dynamic properties of the vulcanizate.

To effect vulcanization, the polymer composition of this invention is mixed with elemental sulfur and a conventional accelerator such as 2-mercaptobenzothiazole, a thiuram, a sulfenamide, a dithiocarbamate, or an amine compound such as diphenylguanidine, aldehyde-amine reaction products. Other compounding ingredients such as activators, processing aids, fillers, and tackifiers may also be incorporated into the polymer during compounding. The compounded polymer is then shaped, moulded and subjected to suitable vulcanization conditions of temperature and time in accordance with the conventional methods.

The invention is illustrated by the following examples wherein all parts given are parts by weight unless otherwise stated.

EXAMPLE I

A cis-1,4 polybutadiene produced in the presence of an aluminum alkyl halide and a cobalt salt-containing catalyst was used to prepare stabilized vulcanizates. The polybutadiene had a Mooney viscosity (ML-4 at 100° C.) of 40 and a cis-1,4 content of greater than 95% and contained about 1% of ditertiarybutyl-4 methyl phenol. Three experimental samples contained 2-mercaptobenzimidazole in the amounts shown in Table I. A control sample was free of 2-mercaptobenzimidazole. All polymer samples were compounded in the following recipe:

Compounding recipe Y

Ingredients: Parts
- Cis-1,4 polybutadiene _____ 90
- #1 smoked sheet _____ 10
- ISAF carbon black (intermediate super abrasion furnace) _____ 50
- Plasticizer petroleum oil (48% by wt. aromatics) _____ 10
- Paraffin wax _____ 2.0
- Mixed diaryl-paraphenylene diamine (antioxidant) _____ 1.0
- Stearic acid _____ 3.0
- Zinc oxide _____ 3.0

Curatives:
- Benzothiazyl disulphide _____ 0.45
- Diphenylguanidine _____ 0.75
- Sulphur _____ 1.25

Portions of the compounded stock were cured for 40 minutes at 135° C., and the cured specimens were tested for tensile strength at break. One half of the specimens were unaged, the other half was aged in the presence of air for 16 hours at 5.6 atm. and 113° C. Percent retention of tensile strength was calculated from these measurements. Other portions of the compounded stock were tested for scorch and curing rate by a Monsanto oscillating disc rheometer (Model L.S.D.) at 145° C. The rheometer was operated for a duration of 60 minutes at a torque range of 100 inch-pounds. The scorch time was taken as the time in minutes to rise 2 inch-pounds above the minimum torque. The curing rate was determined by plotting the torque recorded against time intervals at 10, 15, 20 and 25 minutes, and determining the slope of the plotted line.

TABLE I

| | Sample | | | |
|---|---|---|---|---|
| | Control I | A | B | C |
| 2-mercaptobenzimidazole (parts per 100 parts of polymer) | 0 | 0.1 | 0.5 | 1.0 |
| Tensile strength, unaged (kg./cm.²) | 208 | 196 | 200 | 173 |
| Tensile strength, aged (kg./cm.²) | 128 | 147 | 147 | 146 |
| Retention of tensile strength (percent) | 64 | 75 | 74 | 84 |
| Scorch time (minutes) | 3.9 | (¹) | 4.1 | 4.4 |
| Curing rate slope in Monsanto rheometer (inch-lb./min.) | 10.7 | (¹) | 6.6 | 9.2 |
| Time to 90% of optimum torque (minutes) | 13.8 | (¹) | 15.1 | 13.5 |

¹ Not tested.

The above results indicate that the addition of 2-mercaptobenzimidazole in amounts from 0.1 to 1.0 part significantly improved retention of tensile strength on accelerated ageing.

EXAMPLE II

Two vulcanized samples were prepared using a cis-1,4 polybutadiene having a Mooney viscosity of 37 and stabilized with about 1% of a 1/1 mixture of 2.6 ditertiary butyl-4 methyl phenol and tri(nonylphenyl) phosphite. Instead of 2-mercaptobenzimidazole of Example I 5,5'-dimethyl-2,4-dithiohydantoin and 5,5'-pentamethylene-2,4-dithiohydantoin were used in an amount of 1 part by weight per 100 parts of polybutadiene. The compounding recipe and test procedure were the same as in Example I.

Test data are given in Table II. They show the marked improvement in the retention of tensile strength during ageing obtained without adverse effect on the scorch and cure rate.

TABLE II

| | Sample | | |
|---|---|---|---|
| | Cont. II | D | E |
| Additive | Nil | 5,5'-dimethyl-2,4-dithiohydantoin | 5,5'-pentamethylene-2,4-dithiohydantoin |
| Tensile strength, unaged (kg./cm.²) | 199 | 179 | 186 |
| Tensile strength, aged (kg./cm.²) | 148 | 155 | 149 |
| Retention of tensile strength (percent) | 74 | 86 | 80 |
| Scorch time (minutes) | 3.7 | 3.5 | 3.1 |
| Curing rate slope in Monsanto rheometer (inch-lbs./min.) | 11.0 | 6.6 | 11.8 |
| Time to 90% optimum torque (minutes) | 12.4 | 14.8 | 10.8 |

EXAMPLE III

In this experiment, the cis-1,4- polybutadiene described in Example I was mixed with 0.5 part per 100 parts polymer of mercaptobenzoxazole. The mixture was compounded and cured as in Example I and tested for tensile strength before and after ageing and the retention of tensile strength was calculated. A portion of the compounded stock was tested by rheometer for scorch and curing rate. The results of these tests are as follows:

Retention of tensile strength (percent) _____ 72
Scorch time (minutes) _____ 4.5
Curing rate slope (inch-lbs./min.) _____ 9.3
Time to 90% of optimum torque (minutes) _____ 13.3

By comparing to the control sample of Table I, it can be seen that mercaptobenzoxazole improved the retention of tensile strength.

EXAMPLE IV

Three stabilized compositions of a butadiene polymer were prepared by admixing a styrene butadiene block copolymer with 1.0 part by weight per 100 parts of the copolymer of one of the following compounds:

5,5 dimethyl-2,4 dithiohydantoin
5,5-pentamethylene spiro-2,4 dithiohydantoin
2-mercaptobenzimidazole The block copolymer which was a 100% soluble polymer of the SBS type in which S stands for polystyrene block and B for polybutadiene block, contained about 40% by weight of bound styrene and had a molecular weight of about 120,000 which corresponded to a micro Mooney of 33.

The 10 gms. mixture was banded onto the hot rolls of a micro rubber mill and about 1 gm. samples were taken at 10-minute intervals for up to 60 minutes. The samples were used for a 4 minute micro-Mooney determination at 100° C. A control sample stabilized with 1 part by weight of tris(nonylphenyl) phosphite was also included in the test. The results are shown in Table III.

The micro Mooney determinations were carried out using a Mooney viscometer in which the cavity and the large rotor were replaced with a small cavity and a smooth slightly convex 3.81 diameter rotor. The readings, taken after 4 minutes of running at 100° C. at a rotor speed of 1/22 revolution per minute, approximately correspond to ML–4 at 100° C. readings.

This severe test in which hardly any high polymeric material remains unaffected, showed significant differences between the control and Samples F, G and H. The control was degraded to low Mooney values after 20–30 minutes of milling at 160° C. and at 193° C. it was crosslinked within 5 minutes. Samples F, G and H on the other hand, showed a better stability of both temperatures. The Mooney values were not affected at 160° C. was drastically as those of the control sample and cross-linking was retarded.

What is claimed is:

1. A stabilized polymer composition comprising a mixture of (1) a polymer of a conjugated diolefin produced in the presence of an organometallic catalyst and (2) 0.1–5 parts by weight per 100 parts by weight of polymer of a compound selected from the group consisting of compounds having the structure:

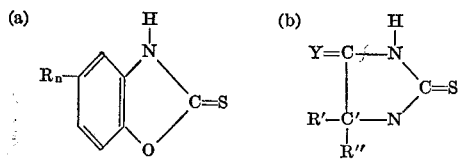

and (c) zinc salts derived therefrom, where Y is oxygen or sulphur, R is a hydrocarbyl radical, $n$ is a number from 0 to 3, R' and R" each is hydrogen or a $C_1$–$C_6$ hydrocarbyl radical or both are a divalent polymethylene radical forming an alicyclic ring with C'.

2. The composition according to claim 1 in which the polymer is a block copolymer of the A–B–A type where A is a block of a polymerized monovinylidene compound and B is a polybutadiene block.

3. The composition according to claim 1 in which the polymer is a polybutadiene produced in the presence of a catalyst comprising an organo aluminum compound and a Group VIII metal salt and having more than 90% of the butadiene units in the cis-1,4 configuration.

4. The composition according to claim 1 in which compound (b) is selected from the group consisting of 5,5-polymethylene spiro-2,4 dithiohydantoin or a 5,5-dialkyl-2,4 dithiohydantoin having one to six carbon atoms in the alkyl group.

5. The composition according to claim 1 in which compound (a) is 2-mercaptobenzoxazole.

6. The composition according to claim 1 in which an antioxidant is also present comprising a mixture of a hydrocarbyl substituted phenol and a hydrocarbyl substituted phosphite.

7. The composition according to claim 6 also containing 0.1–5 parts by weight per 100 parts of polymer of a rosin acid.

TABLE III

| Stabilizer | Control III | | F | | G | | H | |
|---|---|---|---|---|---|---|---|---|
| | Tris(nonyl phenyl) phosphite | | 5,5-dimethyl-2,4-dithiohydantoin | | Methylene 5,5-penta-spiro-2,4-dithiohydantoin | | 2-mercapto-benzimidazole | |
| Milling temperature, °C | 160 | 193 | 160 | 193 | 160 | 193 | 160 | 193 |
| Micro Mooney: | | | | | | | | |
| 10 min. of mill | 28 | X | 26 | 22 | 27 | 25 | 26 | 24 |
| 20 min. of mill | 20 | X | 25 | 19 | 25 | 23 | 22 | 20 |
| 30 min. of mill | 12 | X | 26 | X | 26 | 22 | 20 | 18 |
| 60 min. of mill | 22 | X | 32 | ------ | 32 | X | 24 | ¹ 25 |

¹ Tested after 50 minutes of milling.
X highly crosslinked.

References Cited

UNITED STATES PATENTS

| 1,933,962 | 11/1933 | Bogemann et al. | 260—800 |
| 2,727,014 | 12/1955 | Harbison | 260—41.5 |
| 3,062,779 | 11/1962 | De Hilster | 260—45.9 |
| 3,080,338 | 3/1963 | Nudenberg et al. | 260—45.7 |
| 3,251,905 | 5/1966 | Zelinski | 260—879 |
| 3,265,736 | 8/1966 | Wheeler | 260—576 |
| 3,397,167 | 8/1968 | Gruver | 260—33.6 |
| 3,400,113 | 9/1968 | Winter et al. | 260—94.3 |
| 3,406,146 | 10/1968 | Ley et al. | 260—45.95 |
| 3,516,963 | 6/1970 | Friedman | 260—45.8 |

DONALD E. CZAJA, Primary Examiner

R. A. WHITE, Assistant Examiner

U.S. Cl. X.R.

260—45.7 P; 45.75 R, 45.8 N, 45.8 NZ, 45.95, 94.3, 880 B